United States Patent [19]

Lorgé et al.

[11] 4,049,761
[45] Sept. 20, 1977

[54] PROCESS FOR THE MANUFACTURE OF ORIENTED HOLLOW ARTICLES MADE OF THERMOPLASTIC MATERIAL

[75] Inventors: Michel Lorgé, Brussels; Roger Houba, Gembloux, both of Belgium

[73] Assignee: Solvay & Cie., Brussels, Belgium

[21] Appl. No.: 557,376

[22] Filed: Mar. 11, 1975

[30] Foreign Application Priority Data

Mar. 15, 1974  France ............................ 74.09380

[51] Int. Cl.² .................. B29C 17/07; B29C 17/12
[52] U.S. Cl. .................................. 264/89; 264/99;
264/150; 264/151; 264/161; 264/163; 264/296;
425/527; 425/530; 425/806
[58] Field of Search ................... 264/89, 90, 92, 94,
264/96, 97, 98, 99, 150, 151, 161, 163, 296;
425/326 B, 387 B, 302 B, 305 B, 296, 806 B,
DIG. 214, DIG. 212, DIG. 215

[56] References Cited

U.S. PATENT DOCUMENTS

| | | | |
|---|---|---|---|
| 3,763,297 | 10/1973 | Del Piero et al. ............... | 425/296 X |
| 3,795,162 | 3/1974 | Jaeger ......................... | 425/806 A X |
| 3,814,783 | 6/1974 | Dardaine et al. .............. | 425/DIG. 212 |
| 3,873,660 | 3/1975 | Reilly et al. .................. | 264/89 |
| 3,900,120 | 8/1975 | Sincock ........................ | 215/1 C |
| Re. 23,564 | 10/1952 | Hobson ......................... | 264/98 X |

Primary Examiner—Jan H. Silbaugh
Attorney, Agent, or Firm—Spencer & Kaye

[57] ABSTRACT

In the manufacture of oriented hollow articles made of thermoplastic material by the steps of extruding a continuous hot tubular parison of thermoplastic material; pre-blowing such parison in a pre-blowing mold to produce preforms having a cylindrical body with a diameter not more than 20% greater than that of the parison; thermally conditioning the resulting preforms at a temperature sufficient to cause orientation of the thermoplastic material when it is being stretched; and effecting a final blow-molding of the thermally conditioned preforms, the mechanical properties of the resulting articles in the vicinity of their base are improved by carrying out the pre-blowing step while holding each parison tightly between two half-molds defining a cavity which has the shape, at the location of the base of the preform, of a quarter sphere of diameter equal to that of the preform, and cutting off the resulting flash by means on an elongated blade having a semicircular cross section and a diameter corresponding to that of the base of the cavity, and mounted at the base of one of the half-molds, the blade traveling against the base of the cavity in a direction perpendicular to the closure plane of the mold.

4 Claims, 5 Drawing Figures

PROCESS FOR THE MANUFACTURE OF ORIENTED HOLLOW ARTICLES MADE OF THERMOPLASTIC MATERIAL

BACKGROUND OF THE INVENTION

The present invention relates to a process for the manufacture of oriented hollow articles which are made of thermospastic material and which possess improved mechanical properties, as well as to a device which is very particularly suitable for carrying out the process.

Numerous processes and devices for blow-molding hollow articles, such as bottles, cans or barrels, of thermoplastic material are already known.

More recently, it has been found that it was possible to substantially improve the mechanical properties of these articles by a judicious choice of the manufacturing conditions so as to induce preferential orientation of the macromolecules in these articles. It has in fact been noted that, for each type of thermoplastic material, a temperature range generally exists for which stretching of these materials, for example under the effect of expansion due to blowing, leads to molecular orientation which causes an improvement in the mechanical properties.

The manufacture of oriented hollow articles made of thermoplastic material, however, necessitates an additional operation compared with the conventional processes, because it is advisable to adjust the temperature of the plastic before carrying out the blow-molding operation. In general, during the manufacture of orientated hollow articles by the technique of blow-molding, a preform is produced in a first step and then, after a second step involving the thermal conditioning of the preform, the latter is transferred to a blow-mold where it is given its final shape while it is at a temperature suitable for promoting its orientation.

According to a first type of process, the preform is produced by injection molding and then, after thermal conditioning in the injection mold and/or outside the latter, the preform is transferred to the blow-mold. However, injection molding of the preform, which is a slow operation, seriously limits the productivity of the installations which apply this technique.

According to a second type of process, the perform is produced from a length of tubular parison which is passed over a support and reheated, while one end of the parison is plastically deformed and sealed by means of a punch which cooperates with the support so as to close the base of the preform. This technique requires that there be discontinuity between the extrusion of the parison and the molding of the preform. Because of this, the substantial amount of heat possessed by the extruded thermoplastic material is lost. Moreover, the reheating process and the molding of the base are also slow operations.

According to a third type of process, which permits the highest rates of production and possesses the greatest economy of means, the preform is produced by blow-molding portions of a tubular parison which is extruded continuously using preform molds. The preforms, after thermal conditioning in the preform molds and/or outside the latter, are introduced into suitable blow-molds. Although this technique possesses the additional advantage of being continuous, it has, however, not hitherto been possible to master it completely satisfactorily, for reasons to be explained below.

During the manufacture of oriented hollow articles, it is advisable, in order to achieve optimum improvement in the mechanical properties, to produce preforms having a diameter which is as small as possible, that is to say as close as possible to the diameter of the starting tubular parison, and having a length which is substantially less than those of the hollow articles desired. In fact, the preform is generally produced under temperature conditions which do not lead to molecular orientation (extrusion temperature). It is consequently advisable to provide for maximum stretching of the preform during the final blow-molding operation which is carried out on it under conditions which promote orientation. It can thus be seen that, by respecting the dual condition given above, there can be produced bi-oriented hollow articles, i.e. hollow articles which are oriented both in the radial direction and in the longitudinal direction, which possess a maximum degree of orientation, and consequently the best mechanical properties.

When the preforms are produced by pre-blowing, they possess a base flash which has to be removed before carrying out the final blow-molding operation in order to prevent any malformation of the bases of the hollow articles produced.

In order to remove this flash, preforms possessing a flat base are produced so that the base flash can be cut off easily by means of a flat knife which follows a rectilinear, or straight line, trajectory against the base of the preform mold.

This method of working leads to preforms whose base part is of irregular shape, because of the pinching effected on the parison and because it is cut along a straight line during the deflashing operation. Because of this, it is found that, during the subsequent final blow-molding operation, this part does not stretch uniformly. As a result of this, the bases of the oriented hollow articles thus produced possess zones of weakness which frequently render the improvement in the mechanical properties imparted by the molecular orientation somewhat illusory.

It has thus not been possible hitherto to develop a process for the manufacture of oriented hollow articles starting from preforms produced by pre-blowing which do not possess zones of weakness in the base part.

SUMMARY OF THE INVENTION

It being an object of the present invention to overcome this problem, the invention is based on applicants' discovery of a process which makes it possible to manufacture oriented hollow articles which possess optimum mechanical properties and which are free from zones of weakness, and does so continuously and with a high rate of production, starting from preforms produced by blowing.

The present invention thus relates to a process for the manufacture of oriented hollow articles made of thermoplastic material of the type including:

1. the extrusion of a continuous hot tubular parison made of thermoplastic material,
2. the formation, by pre-blowing this parison, of preforms with a cylindrical body with a diameter not more than 20% greater than that of the parison,
3. the thermal conditioning of these preforms at a temperature which can cause orientation of the thermoplastic material when it is being stretched, and
4. the final blow-molding of the conditioned preforms, in which, during the formation of the preforms by pre-blowing, the parison is held tightly between two half-molds, the cavity of each half-mold having the shape, at the base of the preform, of a quarter sphere of diameter equal to that of the body of the preform.

By working in this way, applicants have found that when the thermally conditioned preforms are stretched by blowing in the final blow-molds, the wall of these preforms stretches in a perfectly uniform manner and that the hollow articles obtained do not possess any zone of weakness.

The formation of the preforms by pre-blowing can be carried out in suitable molds, continuously or discontinuously. For productivity reasons, however, applicants prefer that this production be carried out continuously. This result can, for example, be achieved by introducing the tubular parison continuously into preform molds positioned end to end on a circular support to which a continuous rotational movement is imparted. This result can, however, be achieved by other means such as, for example, by resorting to two preform molds which shift alternately so as to prevent themselves one after the other under the extrusion head delivering the continuous tubular parison.

The molding of the preform by pre-blowing can be carried out either by means of a blow-tube whose nozzle penetrates into an open end of the portion of the parison enclosed in the pre-blowing mold, or by means of a hollow blow-needle which pierces the wall of the portion of parison completely enclosed in the pre-blowing mold. When this second technique is used, the wall of the portion of the parison must obviously be pierced at some part, for example a false neck, which is thereafter detached from the preform.

This technique also makes it possible to produce, in a single mold, two preforms facing one another across the neck; the bases of the two preforms are, in this case, preferably situated at the ends of the mold. The false neck, which is then situated in the central zone and is used for the blowing operation, can advantageously be common to both preforms so that a single blow-needle suffices.

The preforms are composed generally of three parts, namely the neck which is optionally opened by removing a false neck at the upper part, a cylindrical body and a hemispherical base which is tangential to the cylindrical body and which is of the same diameter as the latter. As has been stated, it is preferable to limit to a low value the proportional increase in the diameter of the cylindrical body relative to the diameter of the tubular parison, during the production of the preforms. Applicants prefer that this increase be limited to a maximum of 20%. It is, however, not prohibited to exceed this limit if it is not desired that the degree of radial orientation, achieved during the final blowing process, should be very high.

Profitable use is advantageously made of the operation of pre-blowing the preforms to carry out the final molding of the neck of the hollow articles desired, since the neck part of the preform is not stretched during the final blowing operation and is thus not oriented.

As far as the height of the preforms is concerned, it is obviously preferable that the height should be considerably less than that of the hollow articles desired in order to permit a degree of axial orientation which is as high as possible, during the final blowing process. It is, however, permissible to produce preforms of the same height as that of the hollow articles desired it it is preferred to give up the benefits derived from optimum longitudinal orientation. The minimum height which the preform can possess must be determined experimentally because it depends especially on the nature of the thermoplastic material of which the preform is made and on the geometry of the hollow article produced.

The preforms produced by pre-blowing possess a hemispherical base which must be perfectly deflashed before carrying out the final blowing operation. The base flash of the preforms results from the crushing of the parison between the two half-molds. It is flat and is joined to the hemispherical base of the preform along a semicircular line. The deflashing process is a very delicate operation since the base possesses a semicircular cross section with a small radius of curvature. It can be carried out after the preforms have been taken out of the pre-blowing mold.

However, applicants prefer to carry out the deflashing operation during the molding of the preforms by pre-blowing.

This deflashing of the hemispherical base of the preforms can advantageously be carried out, during the pre-blowing operation, by the movement of an elongated blade having a semicircular cross section and a diameter which corresponds to that of the wall of the base of the impression of the pre-blowing mold.

This blade travels with a reciprocating movement perpendicular to the plane of the flash to be removed, that is to say along a direction perpendicular to the closure plane of the pre-blowing mold with which it is associated.

The base flash is preferably cut by the blade at the end of the operation of pre-blowing the preform, that is to say when the material to be cut off has already acquired a certain rigidity due to the fact that it has cooled in contact with the pre-blowing mold.

Although this is not absolutely necessary for the realization of the process according to the invention, it is advantageous that profitable use should be made of the pre-blowing operation in order to effect thermal conditioning of the preforms produced by cooling them, or at least in order to initiate the thermal conditioning. This result can be achieved especially by equipping the perform molds with means such as cooling channels.

The thermal conditioning can be carried out or continued, for example, in a thermostatically controlled chamber in which the preforms remain for a time after they have been released from the mold and before they are transferred to the molds for effecting the final blowing operation.

This heat treatment, which amounts to cooling the preforms uniformly so as to bring them into the desired temperature range or to cool them more vigorously and to reheat them thereafter in order to bring them into this same range, obviously depends on the nature of the thermoplastic material of which they are made.

The thermally conditioned preforms are finally transferred to the final blow-molds where they are shaped in accordance with the usual techniques.

Because the operation of deflashing the base of the preforms is the delicate point of the process according to the invention, applicants have developed an improved device for enabling this operation to be carried out correctly and reliably.

This device, which also forms part of the invention since it enables the invention to be carried out satisfactorily, includes a preform mold formed from two half-molds which can be separated, the molds defining a cavity whose base is of hemispherical shape, one of the half-molds being equipped at its base with an elongated blade of semicircular cross section and of diameter corresponding to that of the base of the cavity, this blade being equipped with means which cause it to travel periodically against the base of the cavity of the mold and perpendicularly to the closure plane of this same mold.

According to a preferred embodiment, the blade is supported, as it travels, by means of a blade-guide support firmly fixed to the base of the half-mold on which the blade is mounted. It is advisable, moreover, to provide a clearance zone in the base of the half-mold which does not support the blade in order to make is possible for the blade to travel beyond the closure plane of the mold.

In order to facilitate the operation of cutting off the flash, it is desirable to carry out the operation gradually.

This result can be achieved by giving the useful part of the blade an oblique cutting edge, i.e. a guillotine blade. The angle given to this oblique cutting edge can vary between wide limits depending on the nature of the thermoplastic material employed and the thickness of the tubular parison extruded.

This angle must not, however, be too large or else the path of the blade will have to be too long in order to ensure that the base flash is cut off completely. In general, the applicants prefer that this angle should be between 5° and 60°, and preferably between 5° and 45°.

The cutting edge of the semicircular blade which cuts off the flash must preferably be sharpened. The cutting angle of this cutting edge must preferably be less than 60°. It is possible, moreover, to provide a clearance angle on this cutting edge.

The periodic movement of the blade can be brought about by mechanical, electrical, hydraulic or pneumatic means and can be controlled by a cam, a micro-switch or a programmer. According to a preferred embodiment, the blade is fixed to a metal rod and the blade is made to follow the useful path by means of a cam or a jack acting on the end of this rod and is made to follow the return path by means of a return spring.

The process according to the invention and, in particular, the device developed for carrying it out, are moreover illustrated in greater detail in the description of an embodiment which now follows. This description is, however, given purely by way of illustration and it consequently does not limit the scope of the present invention in any way.

DESCRIPTION OF THE PREFERRED EMBODIMENTS

Figure 1:
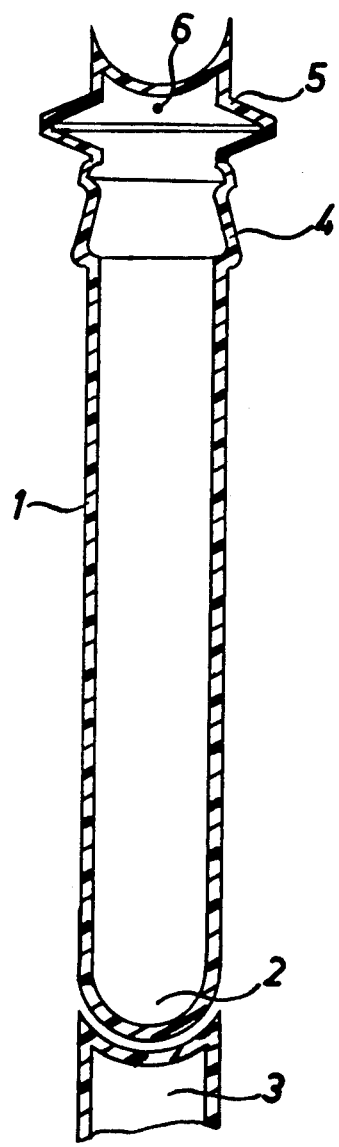
FIG. 1 is a cross-sectional view of a preform produced by pre-blowing in accordance with the process according to the invention, the base flash being cut off.

As can be seen in FIG. 1, the preform 1 produced in accordance with the process according to the invention possesses a hemispherical base 2, the flash 3 of which is cut. This preform possesses a neck 4 molded during the pre-blowing of the preform. This neck is surmounted by a false neck 5 which makes it possible to shape the preform by means of a hollow blow-needle (not shown) which has pierced the wall of this false neck and left a puncture mark 6. This false neck is preferably cut before carrying out the final blowing operation. The tubular portion of the preform possesses a diameter which is substantially equal to that of the starting tubular parison.

Figure 2:
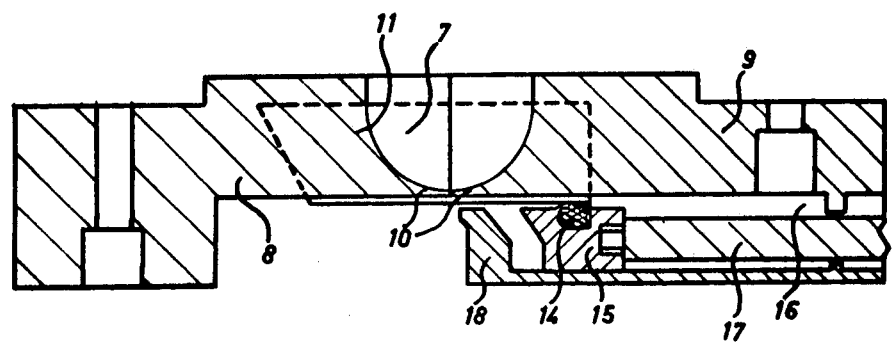
FIG. 2 is a cross-sectional elevational view of the base of a preform mold according to the invention.
Figure 3:
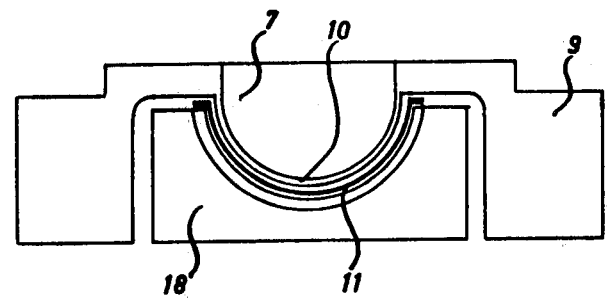
FIG. 3 is a profile view, in a plane perpendicular to that of FIG. 2, of the base of the right half-mold of FIG. 2.

In order to produce this preform by pre-blowing, a preform mold consisting of two half-molds was used, and the bases of these half-molds are illustrated in FIGS. 2 and 3.

As can be seen in these figures, the base part of the cavity 7 of the bases of the half-molds 8 and 9 is hemispherical in shape.

The bases of the half-molds are parts which are separate from those forming the body parts (not shown) of the half-molds. This arrangement makes it possible to change the length of the preforms at will, simply by changing the length of the hollow body parts of the preform half-molds and retaining the base parts. It is however very obvious that the preform half-molds can be produced in a single piece.

As can be seen more particularly in FIG. 3, the wall 10 of the cavity is thinned down in the zone of the hemispherical base 7.

A movable blade 11 is positioned in the base half-mold 9 so as to be able to travel around the partition 10.

Figure 4:
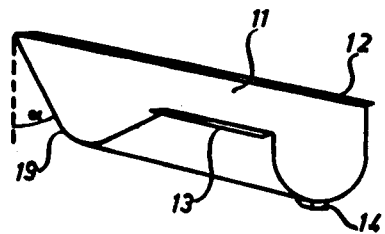
FIG. 4 is a perspective view ocf the deflashing blade with which the mold bases shown in FIGS. 2 and 3 are equipped.

This blade 11 is of semicircular shape, has a diameter which corresponds to that of the base of the cavity 7, is of elongated shape and is equipped with rims 12 and 13, which are shown in FIG. 4. A lug 14 provided at its rear lower part is inserted in a control block 15 which can slide in a seat 16 provided in the base of the half-mold 9 and which is connected to a control rod 17.

The blade 11 is supported by a blade-guide support 18 which surrounds it and which is firmly fixed to the base of the half-mold 9.

The useful part of the blade 11 is equipped with a cutting edge 19, the angle $\alpha$ of which is preferably 30°.

Figure 5:
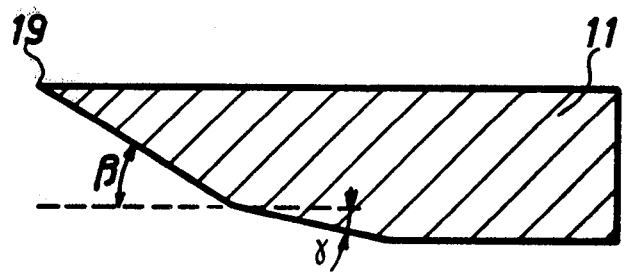
FIG. 5 is a detail view of the cutting edge of the blade shown in FIG. 4.

This part is moveover sharpened so as to possess a cutting angle $\beta$ of 30° and a clearance angle $\gamma$ of 15°, as shown in FIG. 5.

The device as described operates in the following way.

When the preform mold is closed over the tubular parison, the walls 10 of the base of the cavity of the mold crush the parison enclosed in the mold and seal it so that a flash 3 projects from the cavity into the parting plane of the molds.

The portion of parison enclosed in the cavity of the mold is then shaped by means of a known technique of blowing and its base assumes a hermspherical shape which is imposed on it by the shape of the cavity of the mold.

At the end of the operation involving blowing and, where appropriate, thermal conditioning of the blown preform, the rod 17 is shifted towards the left (FIG. 2) under the action of any known control whatsoever, which is not represented. Because of this, the semicircular blade 11 slides between the base of the mold 9 and the blade-guide support 18 and its sloping cutting edge 19 gradually cuts off the flash 3 flush with the walls 10 of the cavity 7. The blade is then pulled back towards the right under the action of any known device whatsover, which is not represented, such as a return spring.

As soon as the blade has returned to its original position, the preform mold can be opened and the preform, which possesses a perfectly deflashed hemispherical base, can be taken out.

After this preform has undergone thermal conditioning, where appropriate, and after the false neck has been removed, the preform is then transferred to a final blow-mold where it expands very uniformly and changes into an oriented hollow article devoid of zones of weakness.

The oriented hollow articles made from thermoplastic materials possess noteworthy mechanical properties. They possess, especially, a very high impact strength and are very resistant to internal pressure. This is why they find their main use in the packaging of beer and non-alcoholic carbonated drinks.

It will be understood that the above description of the present invention is susceptible to various modifications, changes and adaptations, and the same are intended to be comprehended within the meaning and range of equivalents of the appended claims.

What is claimed is:

1. In a process for the manufacture of oriented hollow articles made of thermoplastic material by the steps of:
    extruding a continuous hot tubular parison of thermoplastic material;
    pre-blowing such parison in a pre-blowing mold to produce preforms having a cylindrical body with a diameter not more than 20% greater than that of the parison;
    thermally conditioning the resulting preforms at a temperature sufficient to cause orientation of the thermoplastic material when it is being stretched; and
    effecting a final blow-molding of the thermally conditioned preforms, the improvement wherein said step of pre-blowing is carried out by introducing the parison between two half-molds defining a cavity which has the shape of a hemisphere at the location of the base of the preform, each half-mold having, at such location, the shape of a quarter sphere of diameter equal to that of the preform, and holding the parison tightly between the half-molds in a manner such that the parison presents a portion located outside of the mold cavity adjacent the preform base, and projecting out of the mold to constitute a base flash joined to the resulting preform along a semicircular line, and wherein said process further comprises removing the base flash from the preform, while the preform is still in the pre-blowing mold, by moving an elongated blade having a semicircular cross section, and a diameter which corresponds to that of the wall of the base of the cavity of the pre-blowing mold, with a reciprocating movement perpendicular to the plane of the base flash.

2. Process according to claim 1 wherein the blade includes a cutting portion presenting a cutting edge oblique to the direction of cutting movement of the blade.

3. Process according to claim 2 wherein the edge extends at an angle of between 5° and 60° to a plane perpendicular to the direction of blade movement.

4. Process according to claim 1 wherein said step of deflashing is performed at the end of the step of pre-blowing a preform.

* * * * *